(12) United States Patent
Penzes

(10) Patent No.: US 9,810,250 B2
(45) Date of Patent: Nov. 7, 2017

(54) CLAMPING ASSEMBLY FOR FLEXIBLE CONDUCTORS USED ON ELEVATED PLATFORMS

(76) Inventor: Jay H. Penzes, Colorado Springs, CO (US)

( * ) Notice: Subject to any disclaimer, the term of this patent is extended or adjusted under 35 U.S.C. 154(b) by 1239 days.

(21) Appl. No.: 13/538,058

(22) Filed: Jun. 29, 2012

(65) Prior Publication Data

US 2014/0001327 A1    Jan. 2, 2014

(51) Int. Cl.
*F16B 2/10* (2006.01)
*B65H 75/44* (2006.01)

(52) U.S. Cl.
CPC ............ *F16B 2/10* (2013.01); *B65H 75/446* (2013.01); *B65H 2701/33* (2013.01); *B65H 2701/34* (2013.01)

(58) Field of Classification Search
USPC ............ 248/74.1, 85, 76, 77, 81, 87; 269/31
See application file for complete search history.

(56) References Cited

U.S. PATENT DOCUMENTS

| 199,576 | A | * | 1/1878 | Rodig | 248/84 |
|---|---|---|---|---|---|
| 473,716 | A | * | 4/1892 | Stevens | 239/531 |
| 486,692 | A | * | 11/1892 | Coplin | 285/62 |
| 1,743,537 | A | * | 1/1930 | Freese | 285/148.15 |
| 1,968,736 | A | * | 7/1934 | Bodendieck | 439/479 |
| 2,327,368 | A | * | 8/1943 | Olson | 81/374 |
| 2,465,495 | A | * | 3/1949 | Taliento | 285/89 |
| 2,520,591 | A | * | 8/1950 | Wilmarth | 137/595 |
| 2,631,062 | A | * | 3/1953 | Tiedemann et al. | 239/276 |
| 2,657,096 | A | * | 10/1953 | Holmes | 239/276 |
| 2,711,927 | A | * | 6/1955 | Miller et al. | 239/276 |
| 2,864,906 | A | * | 12/1958 | Medenbach | H04M 1/667 379/445 |
| 3,617,730 | A | * | 11/1971 | Mihailoff | 362/86 |
| 3,751,076 | A | * | 8/1973 | Thais et al. | 285/62 |
| 3,757,283 | A | * | 9/1973 | Kelly | 439/726 |
| 3,831,894 | A | * | 8/1974 | Newton et al. | 248/327 |
| 4,040,714 | A | * | 8/1977 | Grover et al. | 439/803 |
| 4,307,635 | A | * | 12/1981 | Genova | 81/463 |

(Continued)

FOREIGN PATENT DOCUMENTS

| DE | 3801024 A1 * 11/1988 | F16L 3/10 |
|---|---|---|
| DE | 19713989 A1 * 10/1997 | |

(Continued)

OTHER PUBLICATIONS

Enco, Locking Pliers, http://web.archive.org/web/20120216223826/http://www.use-enco.com/1/1/52264-pg114v-strong-hand-tools-welding-clamp-locking-pliers.html, Feb. 16, 2012.*

(Continued)

*Primary Examiner* — Jonathan Liu
(74) *Attorney, Agent, or Firm* — Hanes & Bartels LLC

(57) ABSTRACT

Apparatus for securing the working end of an elongated flexible conductor of fluid or electricity to an elevated work platform comprising a locking C clamp having movable opposed jaws adapted to secure the clamp to the platform and where one of the clamping jaws mounts an adapter that provides an attachment point for connecting a hose or electrical cable to the platform, thus eliminating the necessity of a workman on the platform supporting the weight of and controlling a long length of hose or cable extending from the platform to the ground.

4 Claims, 3 Drawing Sheets

(56) References Cited

U.S. PATENT DOCUMENTS

| | | | | |
|---|---|---|---|---|
| 4,591,192 A * | 5/1986 | Van Exel et al. | | 285/83 |
| 4,669,341 A * | 6/1987 | Small | | 81/418 |
| 4,688,829 A * | 8/1987 | Shioda et al. | | 285/61 |
| 4,726,612 A * | 2/1988 | Picton | | 285/256 |
| 4,740,024 A * | 4/1988 | Hultquist | | 294/116 |
| 4,793,578 A * | 12/1988 | Howard | | 248/62 |
| 4,946,204 A * | 8/1990 | Boticki | | 285/281 |
| 5,015,013 A * | 5/1991 | Nadin | | 285/64 |
| 5,058,869 A * | 10/1991 | Ruthven | | 269/45 |
| 5,160,106 A * | 11/1992 | Monick | | 248/231.71 |
| 5,305,669 A * | 4/1994 | Kimbro et al. | | 81/423 |
| 5,322,253 A * | 6/1994 | Stevens | | 248/229.15 |
| 5,330,139 A * | 7/1994 | Tietje | | 248/65 |
| 5,354,101 A * | 10/1994 | Anderson, Jr. | | 285/25 |
| 5,448,463 A * | 9/1995 | Leen | | 362/396 |
| 5,501,397 A * | 3/1996 | Holt | | 239/124 |
| 5,507,206 A * | 4/1996 | Solski | | 81/9.3 |
| 5,626,320 A * | 5/1997 | Burrell et al. | | 248/230.6 |
| 5,649,565 A * | 7/1997 | Mulla | | 137/343 |
| 5,676,824 A * | 10/1997 | Jeon et al. | | 210/85 |
| 5,683,063 A * | 11/1997 | Seiders et al. | | 248/214 |
| 5,761,774 A * | 6/1998 | Champi | | 24/274 R |
| 5,797,573 A * | 8/1998 | Nasu | | 248/231.31 |
| 5,873,550 A * | 2/1999 | Phillips | | 248/73 |
| 5,991,997 A * | 11/1999 | Schley et al. | | 29/426.5 |
| 6,000,686 A * | 12/1999 | Yates | | 269/6 |
| 6,006,420 A * | 12/1999 | Mills | | 29/721 |
| 6,019,294 A * | 2/2000 | Anderson et al. | | 239/302 |
| 6,056,282 A * | 5/2000 | Desmarais | | 269/37 |
| 6,123,366 A * | 9/2000 | Kiriakopolos et al. | | 285/61 |
| 6,158,229 A * | 12/2000 | Aizawa | | 62/77 |
| 6,196,503 B1 | 3/2001 | Cernosek et al. | | 248/51 |
| 6,256,923 B1 * | 7/2001 | Norton | | 43/4 |
| 6,386,596 B1 * | 5/2002 | Olson | | 285/321 |
| 6,422,520 B1 * | 7/2002 | Hand | | 248/65 |
| 6,484,747 B2 * | 11/2002 | Bridgers | | 137/355.17 |
| 6,749,166 B2 * | 6/2004 | Valentine et al. | | 248/309.1 |
| 6,752,361 B2 * | 6/2004 | Chou | | 248/74.1 |
| 6,834,891 B2 * | 12/2004 | Matsubara et al. | | 285/319 |
| 7,014,225 B1 * | 3/2006 | Goodsel et al. | | 285/364 |
| 7,484,676 B2 * | 2/2009 | Joseph et al. | | 239/290 |
| 7,731,138 B2 * | 6/2010 | Wiesner et al. | | 248/160 |
| 7,854,186 B2 * | 12/2010 | Wu | | 81/395 |
| 8,286,892 B1 * | 10/2012 | Schwanebek | | 239/1 |
| 8,308,167 B2 * | 11/2012 | Balsells et al. | | 279/23.1 |
| 8,356,784 B2 * | 1/2013 | Doll et al. | | 248/229.13 |
| 8,764,253 B2 * | 7/2014 | Ko et al. | | 362/396 |
| 8,777,171 B2 * | 7/2014 | Gainey et al. | | 248/231.71 |
| 8,876,067 B2 * | 11/2014 | McAllister | | F16L 3/085 239/283 |
| 2001/0017340 A1 * | 8/2001 | Cernosek et al. | | 248/510 |
| 2001/0020668 A1 * | 9/2001 | Thomas et al. | | 248/309.3 |
| 2002/0063190 A1 * | 5/2002 | Buck | | 248/74.1 |
| 2003/0150963 A1 * | 8/2003 | Doring | | 248/76 |
| 2003/0196526 A1 * | 10/2003 | Wang | | 81/367 |
| 2004/0045447 A1 * | 3/2004 | Navarro | | 99/403 |
| 2004/0211868 A1 * | 10/2004 | Holmes et al. | | 248/231.71 |
| 2005/0194507 A1 * | 9/2005 | White | | 248/314 |
| 2007/0029796 A1 * | 2/2007 | Bibby | | 285/308 |
| 2008/0060486 A1 * | 3/2008 | Robert | | 81/367 |
| 2008/0073822 A1 * | 3/2008 | Wong | | 269/41 |
| 2008/0141831 A1 * | 6/2008 | Ekola | | 81/9.3 |
| 2009/0064823 A1 * | 3/2009 | Huang | | 81/9.3 |
| 2009/0064826 A1 * | 3/2009 | Robert | | 81/399 |
| 2010/0011917 A1 * | 1/2010 | Wu | | 81/395 |
| 2010/0018365 A1 * | 1/2010 | Tyler | | 81/423 |
| 2010/0181393 A1 * | 7/2010 | Pitzer | | F16L 19/025 239/587.5 |
| 2011/0067184 A1 * | 3/2011 | Robert | | 7/127 |
| 2013/0333940 A1 * | 12/2013 | Stencil | | 174/503 |

FOREIGN PATENT DOCUMENTS

| | | | | |
|---|---|---|---|---|
| FR | 2628393 A1 * | 9/1989 | | E05B 67/14 |
| FR | 2952319 A1 * | 5/2011 | | |
| GB | 2177769 A * | 1/1987 | | F16L 21/06 |

OTHER PUBLICATIONS

Dipolnet, Compression RCA Plug PCT-RCA-59-NT (for RG-59/CAMSET), http://web.archive.org/web/20120214100021/http://www.dipolnet.com/compression_rca_plug_pct-rca-59-nt_for_rg-59-camset_E80440.htm, Feb. 14, 2012.*

* cited by examiner

CLAMPING ASSEMBLY FOR FLEXIBLE CONDUCTORS USED ON ELEVATED PLATFORMS

FIELD OF THE INVENTION

The present invention relates to apparatus used on elevatable workman lift platforms to secure fluid carrying hoses and electrical conduits that extend from the ground level to the raised platform.

BACKGROUND OF THE INVENTION

Platforms for supporting workman performing aerial tasks are usually capable of being raised by a boom or a scissors arrangement to a distance above the ground. In many instances the work being performed on the platform requires that fluid or electricity be conveyed to the platform from the ground level by a conductor. The workman handling the end of the conductor on the platform is tasked with supporting and controlling the entire length of the conductor from the platform to the ground which becomes onerous when the platform is elevated to a position high off the ground, especially when the conductor is a hose filled with fluid.

It is therefore the object of this invention to provide clamping means for attaching the conductor to the platform so that the platform supports the weight of the conductor and allows the workman to concentrate on handling and manipulating a short length of the conductor extending from the clamping device.

DETAILED DESCRIPTION OF PREFERRED EMBODIMENT

Figure 1:
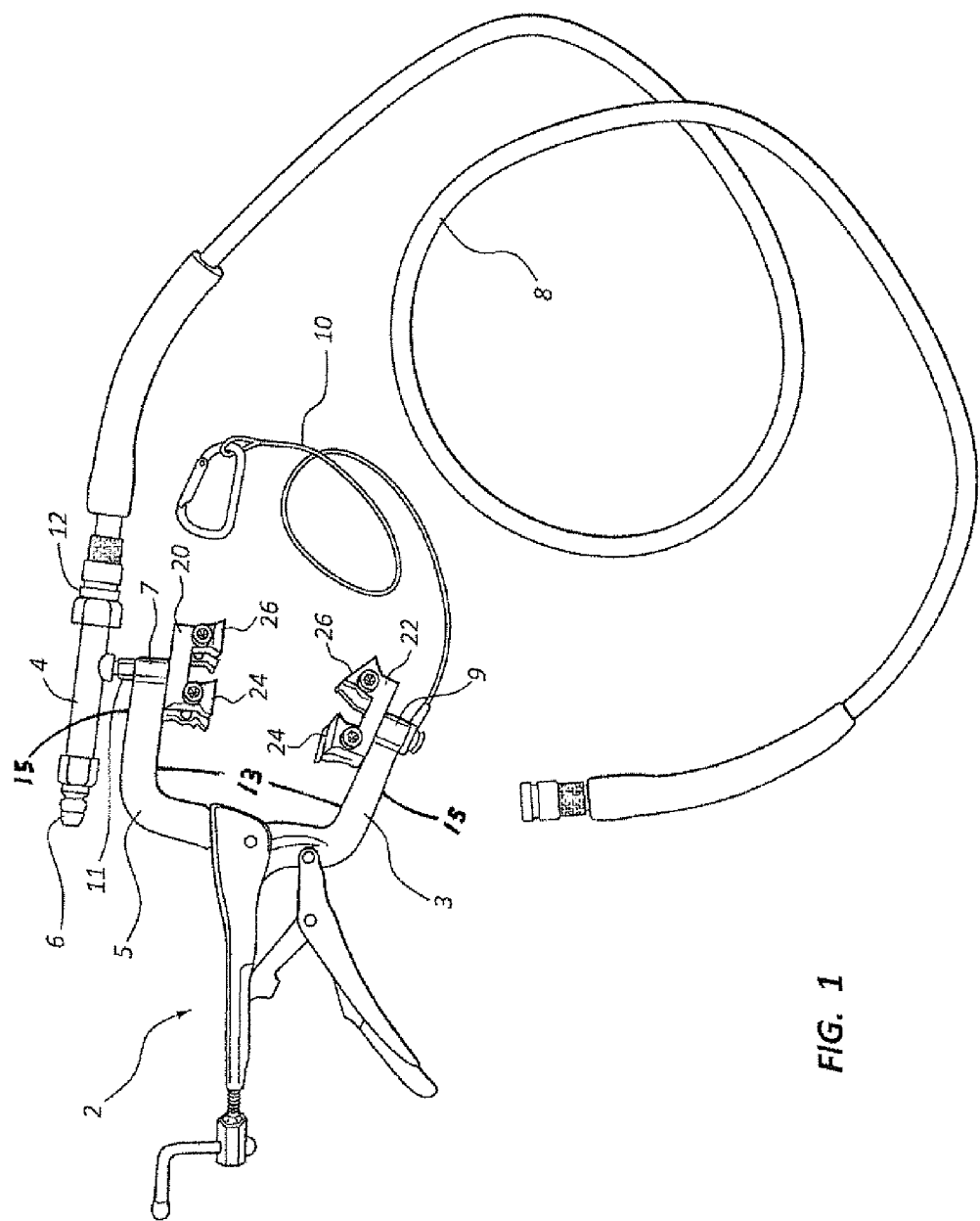
FIG. 1 is a prospective view of the clamping device with the operating, or distal, end of a hose shown attached to an adapter.

The clamping assembly of the present invention includes a locking C clamp 2 having first and second movable opposed jaws 3 and 5, each jaw having an inner edge 13 and an outer edge 15 and where each jaw includes a tip end 7 and 9. A stud 11 having a distal end is connected to the outside edge 15 of the second jaw 5, proximate its tip end 7. The distal end is rigidly fixed to a short fluid conducting adapter 4 having hose couplers 6 and 12 at its respective first and second ends.

Fixed to the inner edges 13 of each of the clamping jaws 5 and 3 are brackets 20 and 22, each having first and second ends to which are respectively mounted a pair of opposed spaced apart swivel mounted pads 24 and 26. In the illustrated embodiment, the brackets and pads are adapted to conform to the contour of a tubular hand rail on a workman's platform although other types and shapes of pads can be used to grip whatever shape is found on the platform that will support the clamp 2.

Figure 2:
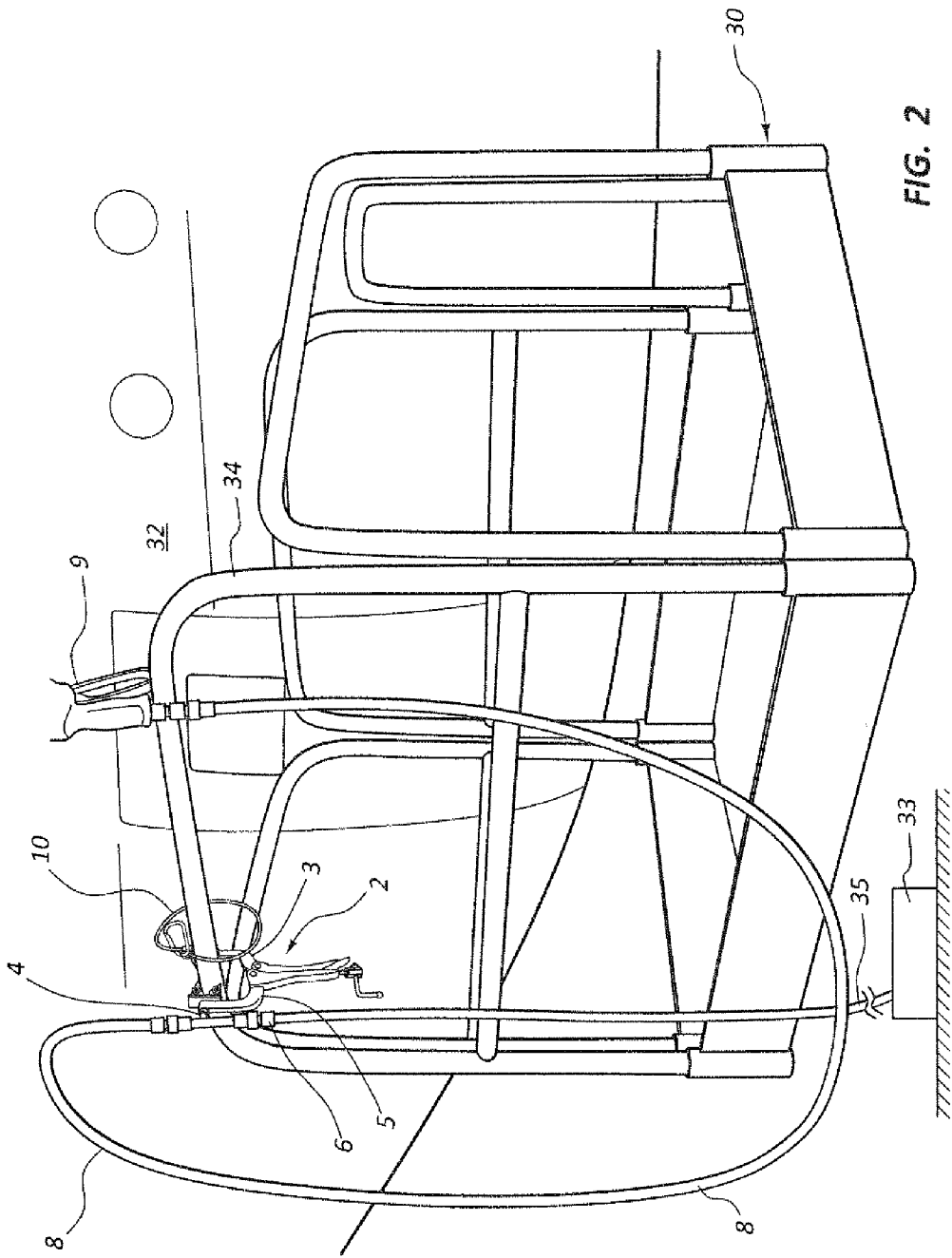
FIG. 2 is a perspective view of a workman lift platform showing the clamping device of the present invention being attached to a hand rail on the perimeter of the platform.

FIG. 2 illustrates a workman's platform 30 that is used for washing or de-icing aircraft 32. A hose conductor 35 is connected at its proximal end to the source 33 of washing, anti-icing or other type of fluid. The distal end of the hose 35 is connected to the hose coupler 6 on the first end of the adapter 4. The locking C-clamp 2 that mounts the adapter is clamped and locked to the hand rail 34 of the platform 30. A safety cable 10 attached at one of its ends to one of the clamping jaws 3 is also secured to the hand rail of the platform with a carabiner 36.

A relatively short length of hose 8 is attached at one of its ends to the hose coupler on the second end of the adapter 4. The other end of the short hose 8 carries an appropriate nozzle 9. Thus it is seen that a workman standing on the platform 30 can manipulate the nozzle and short hose length 8 to perform the task without having to support and control the length of hose 35 going from the platform to the source of fluid below the platform on ground level.

Figure 3:
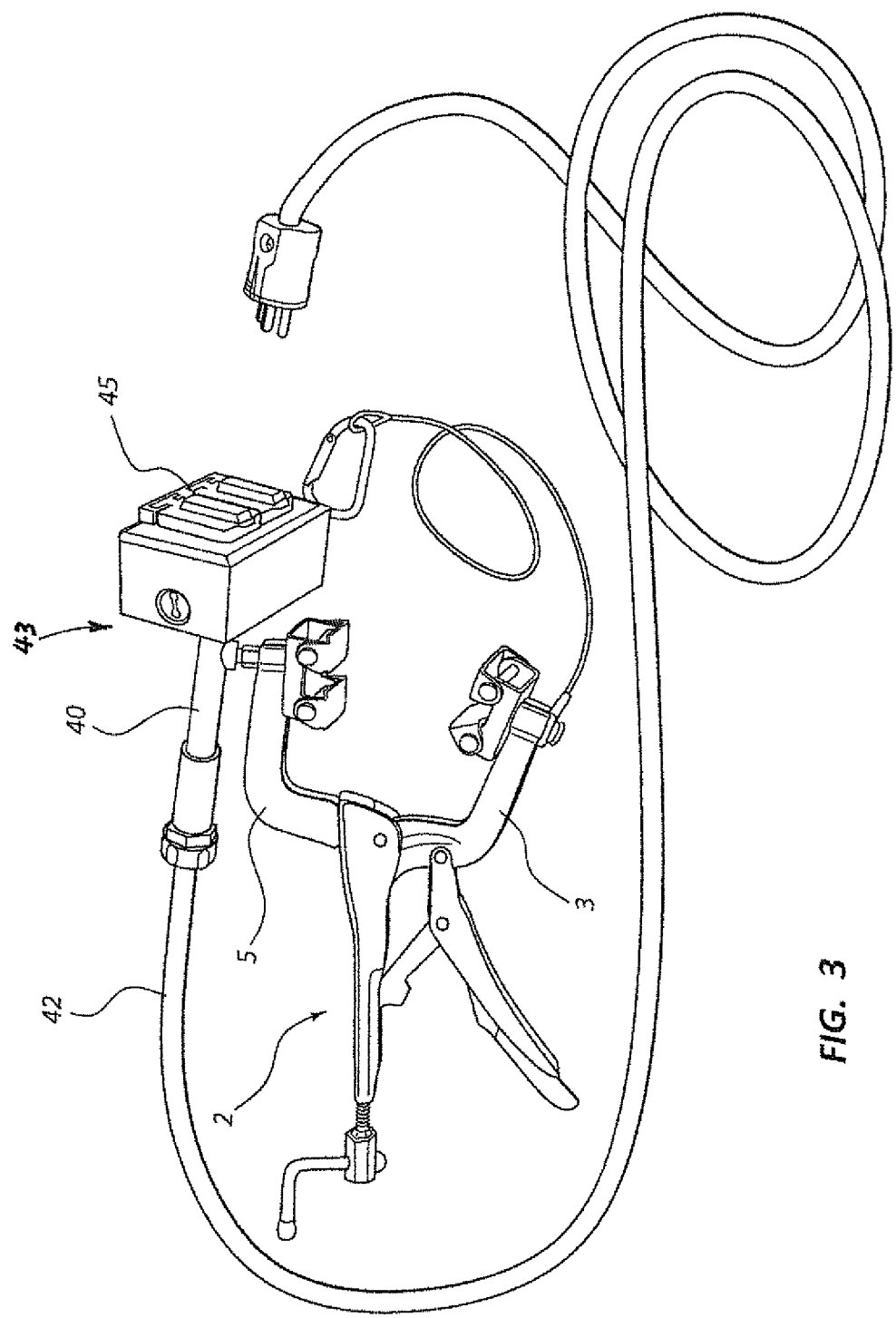
FIG. 3 is a perspective view of the clamping device for securing an electrical conductor to a workman lift platform.

In a second embodiment of the invention, as shown in FIG. 3, an electrical adapter 43 is attached to the jaw 5 of the locking C clamp 2. The electrical adapter comprises a rigid tube 40 carrying the distal end of an electrical conductor 42 that is plugged into a source of electricity on the ground. The distal end of the rigid tube 40 carries an electrical jack 45 the terminals of which are connected to the respective conductors in the cord 42. When the locking C-clamp 2 is attached to the hand rail of a workman lift platform 30, electrical appliances such as drills may be plugged into the jack 45, thus eliminating the need for the workman to support and control a long length of electrical cord from the elevated platform to the source of electricity on the ground.

What is claimed is:

1. Apparatus for securing the working end of an elongated flexible conductor to an elevated work platform comprising,
   a locking C clamp having first and second movable opposed jaws, each having inner and outer edge portions and where each jaw includes a tip end,
   a work platform contacting pad attached to the inner edge of the tip end of each of said jaws,
   rigid adapter means for interconnecting two sections of a flexible conductor, said adapter means attached to the outside edge portion of the first clamping jaw.

2. The apparatus of claim 1 where the adapter means is a fluid conducting tube having proximal and distal ends and a hose connector disposed at each of the proximal and distal ends.

3. The apparatus of claim 1 where the adapter means is an electrical connector having male and female portions.

4. The apparatus of claim 1 where each of the work platform contacting pads comprise a bracket having spaced apart pivotally mounted work contacting pads.

* * * * *